Dec. 1, 1942.  W. T. HEDLUND  2,303,935
ICE SHAPER
Filed April 25, 1941
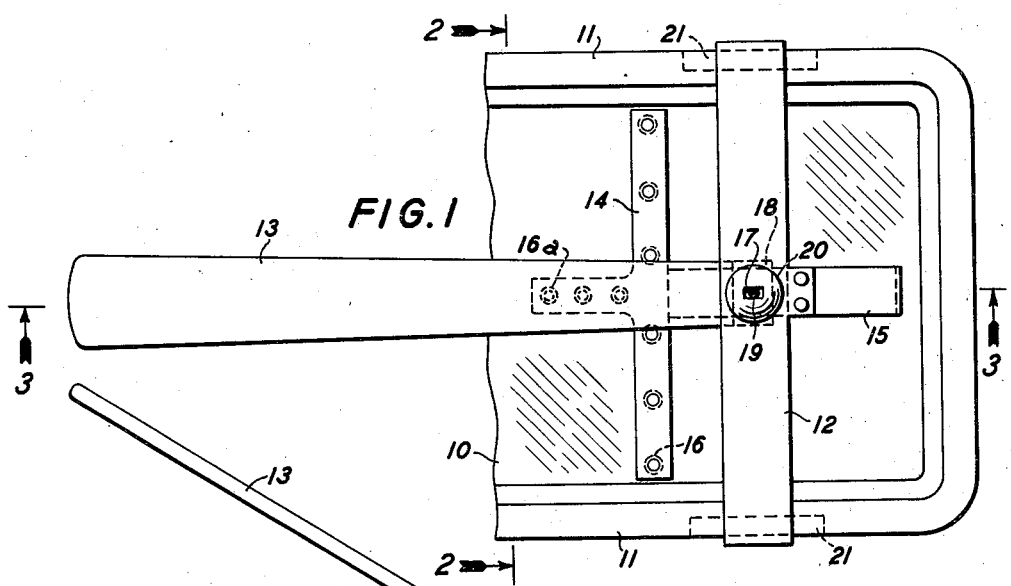
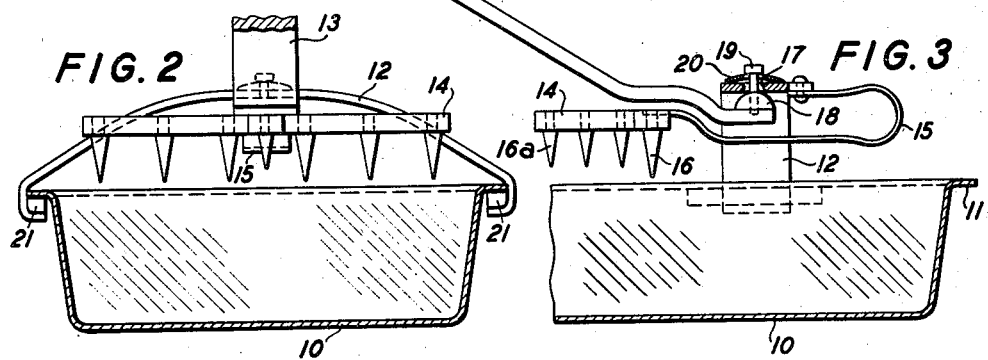
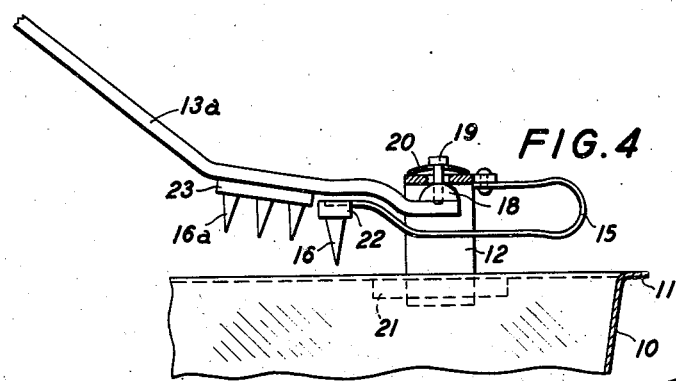
INVENTOR.
William T. Hedlund
BY D. E. Heath
ATTORNEY.

Patented Dec. 1, 1942

2,303,935

UNITED STATES PATENT OFFICE 2,303,935

ICE SHAPER

William T. Hedlund, New Rochelle, N. Y., assignor to Servel, Inc., New York, N. Y., a corporation of Delaware Application April 25, 1941, Serial No. 390,245

17 Claims. (Cl. 62—108.5)

This invention relates to ice shapers, and it is an object of the invention to provide an implement that is easily applied to a refrigerator ice freezing tray to quickly shape pieces of ice from a block of ice in the tray.

Fig. 1 in the accompanying drawing is a plan view of part of a refrigerator ice freezing tray to which is applied an ice shaper embodying the invention;

Fig. 2 is a sectional view on line 2—2 in Fig. 1;

Fig. 3 is a view partly in section on line 3—3 in Fig. 1;

Fig. 4 is a view like that of Fig. 3 showing a modification.

Referring to Figs. 1 to 3, an ice tray 10 has a flat outward flange 11 around its top edge. An ice shaper is removably applied to the tray. This ice shaper consists of a bridge or arch 12 on which are mounted a handle 13 and a shaping member 14.

Member 14 is fastened on one end of a U-shaped leaf spring 15. The other end of leaf spring 15 is secured to the arch member 12. Member 14 is in the shape of a T. A series of prongs 16 project downward from the underside of member 14. The prongs 16a on the short leg of the T-shaped member 14 are shorter than the prongs 16 on the underside of the head of member 14.

Handle 13 overlies member 14. One end of handle 13 is pivotally connected to the bridge 12. Handle 13 projects upward at an angle from bridge 12 and is shaped generally as illustrated in Fig. 3 so that when handle 13 is moved downward it depresses shaper 14 into tray 10. Any suitable pivotal joint may be provided between handle 13 and bridge 12. In the center of bridge 12 there is a slot 17. On the lower end of handle 13 there is formed a half round 18. The half round 18 bears against the underside of bridge 12 where it is held by a headed pin 19 which projects through slot 17. A resilient disc 20 exerts tension between the head of pin 19 and the upper surface of bridge 12 so that the handle 13 is held generally in the position illustrated in Fig. 3. When handle 13 is pushed downward, pin 19 is tilted in slot 17 and compresses disc 20. When handle 13 is released, the tension of disc 20 returns the handle to its upper position. Any other suitable means such as a coiled or leaf spring may be provided to urge handle 13 upward.

The ends of bridge 12 are turned downward and to each end there is secured a bar 21. The bridge 12 is made of a strip of resilient metal. The bars 21 on the ends of bridge 12 engage beneath the flange 11 on opposite sides of tray 10 and are held beneath this flange by the resiliency of bridge 12. The bridge 12 is slidable up and down the length of tray 10 so that the shaper 14 may be moved into position above any part of a block of ice in tray 10. When handle 13 is pushed downward, member 14 is depressed into tray 10 until prongs 16 engage the ice block. Further pressure causes prongs 16 to enter the ice block and cause a fracture across the width of the block. Upon further pressure, shorter prongs 16a engage the ice and cause a fracture perpendicular to the first fracture. This operation may be repeated as long as ice pieces are desired and any ice remains in the tray. By starting operation at the end of the tray which is on the same side of bridge 12 as the member 14, a series of pairs of substantially rectangular ice pieces may be shaped from the ice block.

Referring to Fig. 4, there is shown a slightly modified structure which is like that described in connection with Figs. 1 to 3 except that the T-shaped ice severing element is divided into two parts. The crosshead part 22 is secured to the resilient leaf 15, while the short leg part 23 is mounted directly on the handle 13a. Other parts are the same and are indicated by the same reference characters in the drawing. When the handle 13a is depressed, it carries member 22 downward and injects the teeth 16 into the ice block to cause a transverse fracture of the ice, and then teeth 16a on member 23 are depressed to split the piece of ice already severed by teeth 16.

Various changes and modifications may be made within the scope of the invention as indicated in the following claims.

What is claimed is:

1. An ice freezing tray and a device outside of said tray in movable engagement therewith and operable to pierce and thereby fracture ice in said tray.

2. An ice freezing tray and a device in slidable engagement with the outside of said tray and operable to pierce and thereby fracture ice in said tray.

3. An ice freezing tray having a flange at its upper edge and a device slidably engageable with said flange and operable to pierce and thereby fracture ice in the said tray.

4. An ice freezing tray, a member slidably engageable with the outside of said tray, and ice piercing means mounted on said member.

5. An ice freezing tray having flanges at the upper edges of its side walls, a member slidably engageable with said flanges, and ice piercing means carried by said member.

6. An ice freezing tray and ice fracturing means adapted to slidably engage said tray, said means being operable to pierce and thereby fracture ice in the tray on intersecting lines.

7. An ice freezing tray and ice fracturing means movably supported on said tray and including ice piercing elements in intersecting lines.

8. An ice freezing tray and a T-shaped ice piercing device movably mounted in operative relation with ice in said tray, said parts being so constructed and organized that upon operation of said ice piercing device, the head portion thereof effects ice fracture ahead of the leg portion so as to limit the extent of the fracture caused by said leg portion.

9. An ice freezing tray, a member adapted for slidable engagement with the outside of said tray, a handle pivotally mounted on said member, and means operated by movement of said handle to fracture ice in said tray.

10. An ice freezing tray having outward flanges on opposite sides thereof, a member slidably engageable with said flanges, a handle pivotally mounted on said member, and means operated by movement of said handle to fracture ice in said tray.

11. An ice freezing tray, a member overlying said tray and having its ends in slidable engagement with the exterior of said tray, and means carried by said member operable to pierce and thereby fracture ice in said tray.

12. An ice freezing tray, force multiplying mechanism operable to pierce and thereby fracture ice in said tray, and means for supporting said mechanism and movably engaging the exterior of said tray.

13. An ice freezing tray, a member adapted to slidably engage the exterior of said tray, means to sever ice in said tray resiliently mounted on said member, and a handle mounted on said member for operating said ice severing means.

14. An ice freezing tray, a member adapted to slidably engage the exterior of said tray, a first ice severing means resiliently mounted on said member, a handle carried by said member for operating said first means, and a second means for severing ice in said tray mounted on said handle.

15. An ice freezing tray, a resilient arch having end portions adapted to slidably engage the exterior of said tray, an ice severing element secured to said arch by a leaf spring, and a lever pivotally mounted on said arch and arranged to depress said ice severing means.

16. An ice freezing tray having outward flanges on opposite side walls thereof, a resilient arch having end portions adapted to slidably engage beneath said flanges, an ice severing element mounted on said arch for vertical movement, and a lever pivoted on said arch and operable to depress said ice severing element.

17. An ice freezing tray, means adapted to slidably engage the exterior of said tray, an ice severing element mounted on said means for up and down movement, means urging said element upward and a handle for moving said element downward to sever ice in said tray.

WILLIAM T. HEDLUND.